UNITED STATES PATENT OFFICE.

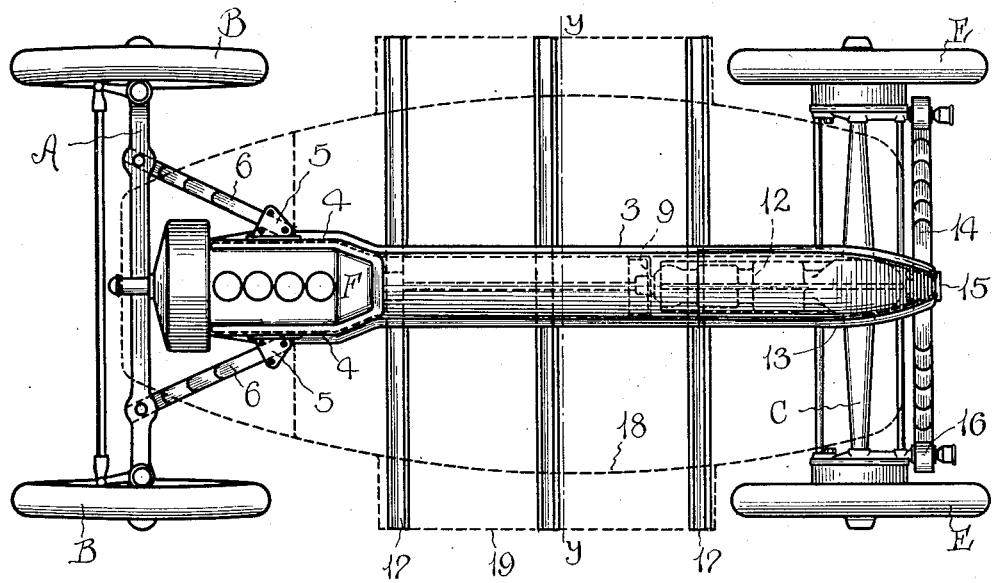
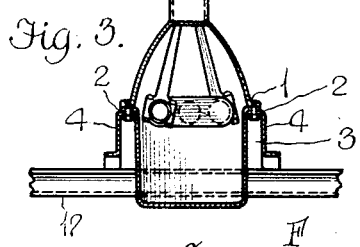
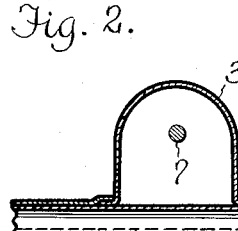
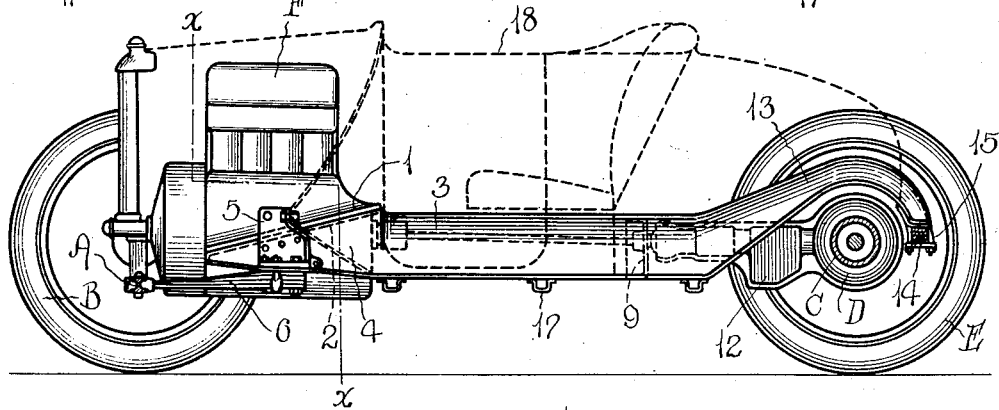

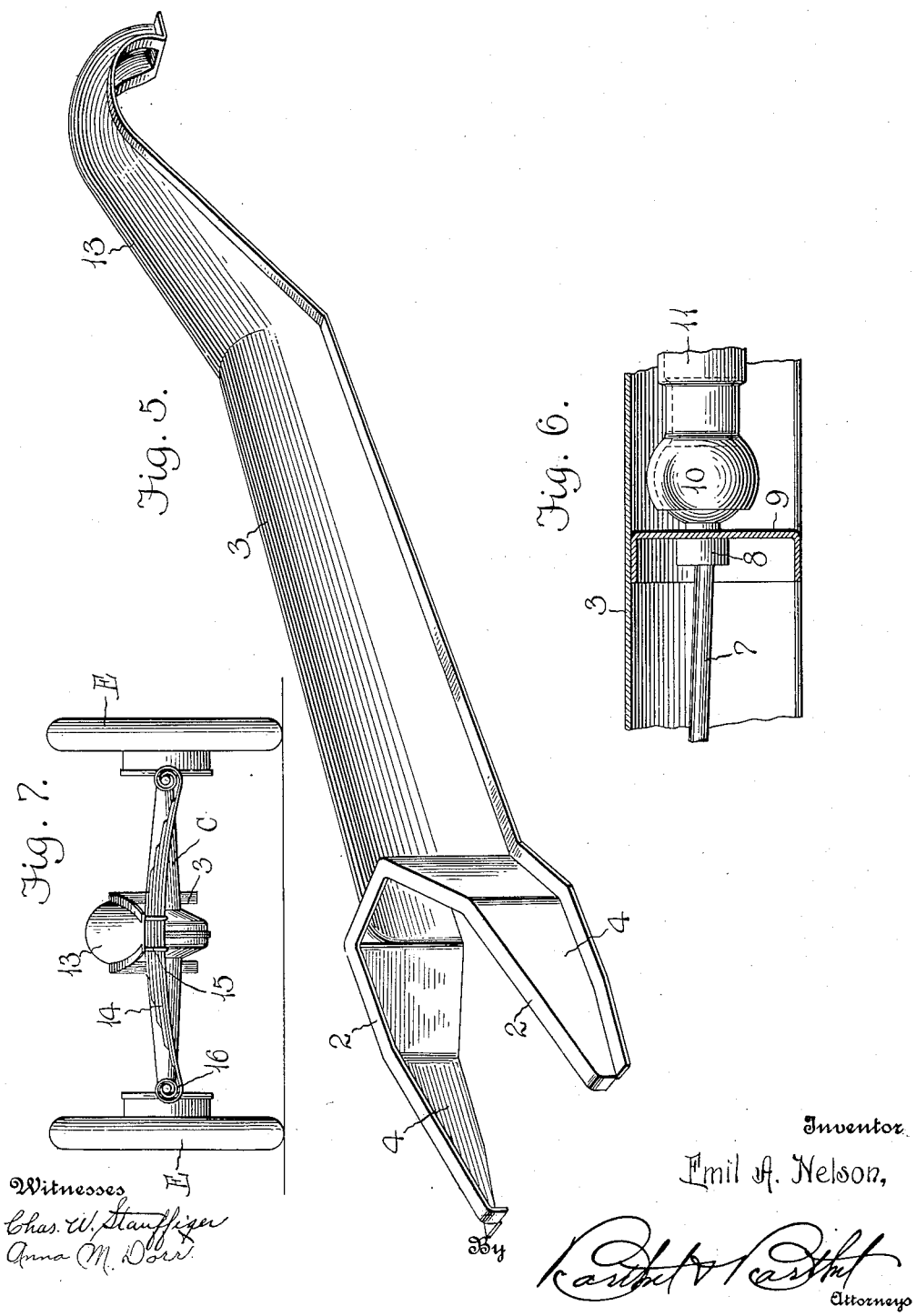

EMIL A. NELSON, OF RONVILLE, MICHIGAN.

MOTOR-VEHICLE.

1,189,284.  Specification of Letters Patent.  Patented July 4, 1916.

Application filed December 17, 1914. Serial No. 877,653.

*To all whom it may concern:*

Be it known that I, EMIL A. NELSON, a citizen of the United States of America, residing at Ronville, in the county of Wayne and State of Michigan, have invented certain new and useful Improvements in Motor-Vehicles, of which the following is a specification, reference being had therein to the accompanying drawings.

This invention relates to an improved chassis construction and suspension for motor vehicles, and its object is to provide a construction wherein the maximum of flexibility of running gear is secured and the load carrying frame or body is relieved of undue shocks or strains.

A further object is to provide a simple construction having a low center of gravity and giving great strength in proportion to its weight, and in which a single member carries the load and serves to house over the means for transmitting motion from the engine to the rear axle.

With these and other ends in view the invention consists in providing a single hollow member rigidly secured to the motor and extended rearwardly therefrom in the longitudinal center line of the vehicle to a single point of spring support upon the rear axle, with the load carrying body or frame mounted directly thereon; the invention further consisting in certain other new and useful features in the construction and arrangement of parts, all as hereinafter more fully described, reference being had to the accompanying drawings in which—

Figure 1 is a side elevation, with parts in section, of a motor vehicle running gear and chassis embodying the invention; Fig. 2 is a plan view of the same; Fig. 3 is an enlarged transverse sectional detail substantially upon the line x—x of Fig. 1; Fig. 4, a similar section upon the line y—y of Fig. 2 with a portion of a vehicle body shown in section; Fig. 5 is a perspective detail of a load carrying member; Fig. 6 is an enlarged sectional detail of a portion of said member with a drive shaft and torque tube in place therein; and Fig. 7 is an end elevation of Figs. 1 and 2.

In the drawings, A indicates a front axle provided with steering wheels B, and C is a rear axle casing formed intermediate its ends with a differential casing D and provided with traction drive wheels E, all constructed and arranged in an old and well known manner.

An engine or motor which may be of any preferred design, is indicated at F and this motor is preferably formed with a laterally extending flange 1 to engage a seat or flange 2 provided therefor upon the forward forked end of a load carrying member 3, said flange being bolted or otherwise detachably secured to its seat to hold the engine in place upon the carrying member. The side arms 4 of the forked end of the carrying member extend forwardly adjacent to each side of the engine casing and suitable brackets 5 are secured to their outer sides, to which brackets suitable leaf springs 6 are rigidly secured in any suitable manner and extend forwardly and laterally or diagonally outward to points of attachment to the front axle near its ends. These springs thus yieldingly support the front end of the member 3 with the engine seated therein and form the only connection between said axle and load carrying member, at the same time serving as radius or brace members to hold said axle at right angles to the longitudinal center line of said carrying member and the central vertical plane of the vehicle.

The flange 1 extends across the rear end of the engine casing above the rear bearing for the crank shaft and the seat therefor extends across the top of the carrying member at the end of the fork, thus forming a U-shaped seat for the engine. This seat is downwardly and forwardly inclined by tapering the arms 4 toward their forward ends and thus a better support is provided for the engine, its seating flange extending across the rear end thereof above its crank shaft bearing and along the line of division between the upper part of the engine crank case and the lower part or detachable pan so that the rear bearing and projecting end of the crank shaft of the engine will come within the horizontal plane of the supporting member.

Rearwardly of its forked forward end, the supporting member is of inverted U-shape in cross section thus combining great strength with extreme lightness and cheapness of manufacture, said member being preferably formed of sheet metal, and this channel construction also provides a housing for the driving shaft 7 which is connected to the rear end of the engine crank shaft, (not shown) and extends rearwardly within said channel to a bearing 8 provided therefor upon a transverse wall or member 9 within the channel. This wall also carries one member of a ball and socket joint 10, the other member being formed integral with a torque member or casing 11 which is integral with the rear axle casing C and extends forwardly therefrom. Motion may be transmitted in the usual manner from the rear end of the shaft 7 to differential gearing in the casing D by a shaft connected to the shaft 7 by means of a universal joint within the hollow ball and socket and from said shaft by means of suitable change speed mechanism within the casing 12 which forms a part of the torque member. The entire thrust of the traction wheels is thus taken by the cross member 9 in the carrying member 3, at the longitudinal center line of the vehicle, and as the torque member is connected to the carrying member by means of the ball and socket connection, the axle is free to rise and fall or tilt relative to said member without putting any twisting strain thereon.

The rear end portion 13 of the carrying member 3 is tapered and curved upwardly and rearwardly, thence downwardly at its extreme end to extend upwardly and over the differential casing D. To the downward rear end of the member is secured a leaf spring 14 intermediate the ends of the spring by means of a spring clip 15 or in any suitable manner with said spring extending parallel with and at a short distance to the rear of the axle casing C and its ends pivotally connected in any suitable manner as by helices 16 on the ends of the spring, to the axle adjacent the traction wheels. The load carrying member is thus yieldingly supported in the longitudinal center line of the vehicle at its rear end by the transverse spring which in turn is carried by the ends of the axle, and the rear end portion 13 of said member is also formed inverted U-shape in cross section to give strength and provide clearance for the differential casing.

Secured in any suitable manner to the lower edges of the channel portion of the load carrying member 3, is a plurality of transverse body sills or floor members 17 of a length to extend the full width of the body 18, and these sills also project beneath and support the running boards 19 at the sides of the body. The floor 20 of the body is laid directly upon these sills at each side of the supporting member 3 and thus the entire load is carried but slightly above the horizontal plane of the rear axle and a very low center of gravity is secured. The entire load is also carried by the central longitudinal member 3 which is yieldingly supported at its forward end by the radially disposed spring 6, and at its rear end by the single transverse spring 14 to which it is attached at the longitudinal central vertical plane of the vehicle. All driving, torque, twisting and other strains are transmitted directly to said member 3 at the longitudinal medial vertical plane of the vehicle and as the body is supported solely by this member which forms the backbone of the vehicle, said body is relieved of all strains which would tend to twist and rack it. Because of this load supporting backbone and the manner in which it is suspended from the axles, the sudden jolts and jars incident to the wheels passing over road obstructions, will not be transmitted to the body in such a manner as to shock or cause discomfort to the occupants, as all motion and vibration is carried to the center supporting member or backbone and the spring resisted rocking motion of the body is enhanced by the overhang of the body at each side of this center support.

The necessity for heavy side frame members for supporting the body is obviated by the center supporting member construction and thus the floor of the body may be lowered, giving a lower center of gravity and easy access to the body, at the same time greatly reducing the cost of manufacture and permitting the front steering wheels to be turned without hindrance.

Obviously many changes may be made in the form and arrangement of parts without departing from the spirit of my invention and I do not therefore limit myself to the construction shown.

What I claim is:—

1. In a motor vehicle, the combination with a front axle and a rear axle, of a single load carrying member extending longitudinally of the vehicle in the vertical plane of the medial line thereof and having two places of support at its front end upon said front axle to rigidly hold the axle at right angles to said plane, said member being tapered rearwardly and extended over the rear axle, a transverse spring on the rear axle connected intermediate its ends to the rear end of said member and forming a single place of support for the rear end of said member and a single member rigidly secured to the rear axle extending forwardly therefrom to a point of connection with said member and having a universal connection therewith.

2. In a motor vehicle, the combination with a front axle and a rear axle, of a single load carrying member extending longitudinally of the vehicle in the vertical plane of the medial line thereof and having a single place of support at its rear end upon the rear axle, and springs rigidly secured to said member near its front end and extended forwardly to points of connection with the front axle, said springs serving to yieldingly support the load and form brace and connecting members to hold the axle in proper relation to said member.

3. In a motor vehicle, the combination with a front axle and a rear axle, of a single load carrying member extending longitudinally of the vehicle in the vertical plane of the medial line thereof and having a single place of support at its rear end upon the rear axle, and leaf springs rigidly secured to said member near its forward end and extending forwardly and outwardly from each side thereof to points of connection with the front axle adjacent the ends of said axle, said springs forming the sole support for the front end of the load carrying member and serving to connect said axle with said member and holding it at right angles to the longitudinal center line of said member.

4. In a motor vehicle, the combination with a front and a rear axle, of a single load carrying member formed from sheet metal and having a longitudinally extending body portion at the medial line of the vehicle which is formed of inverted U-shape in cross section, means for closing the lower side of said member throughout a portion of its length to house motion transmitting means, means for yieldingly supporting the rear end of said member upon the rear axle, and means on the rear axle extending forwardly into said open side of said member and having connection therewith to hold said axle in right angular position relative to said member.

5. In a motor vehicle, the combination with a front axle and a rear axle, of a single hollow load carrying member supported by said axles at the medial line of the vehicle and formed with a forked forward end, an engine seated within the forked forward end of said member, and power transmitting means supported within the member for transmitting motion from the engine to the rear axle.

6. In a motor vehicle, the combination with a front axle and a rear axle, of a single load carrying member extending in the longitudinal vertical plane of the medial line of the vehicle and formed with an upwardly curved rear end projecting over the rear axle, means for supporting the forward end of the member upon the front axle, and a transverse spring connected to the rear axle and positioned rearwardly of the longitudinal vertical plane of said axle and secured to the rear end of said member intermediate its ends.

7. In a motor vehicle, the combination with a front axle and a rear axle, of a single hollow load carrying member supported at its forward end upon the front axle and extending rearwardly therefrom in substantially the vertical plane of the medial line of the vehicle and in the horizontal plane of the rear axle, a motor mounted upon the forward end of the said member, said member being formed at its forward end to embrace the crank case of said motor and form a support therefor, power transmitting means carried within said member for transmitting motion from the motor to the rear axle, and means for yieldingly supporting the rear end of the member upon the rear axle, the rear end portion of said member being extended upwardly and over the rear axle to give clearance and permit of a vertical movement of said member relative to the axle.

8. In a motor vehicle, the combination with a front axle and a rear axle, of a single load carrying member supported at its forward end upon the front axle and formed of inverted U-shape in cross section with the forward end portion to embrace and form a seat for a motor, a motor on said forward end portion of said member, a transverse spring carried by the rear axle at the rear side of the vertical longitudinal plane thereof and secured intermediate its ends to the rear end of the load carrying member which is curved upwardly and over the axle with a clearance between said end and said axle, and means within the load carrying member for transmitting motion from the motor to the rear axle.

9. In a motor vehicle, the combination with a front axle and a rear axle, of a single hollow load carrying member supported at its forward end upon the front axle and extending rearwardly therefrom in substantially the medial line of the vehicle and the horizontal plane of the rear axle, said member having an upwardly curved and rearwardly extended end portion projecting over the rear axle, a torque member on the rear axle, a universal connection between the forward end of the torque member and said load carrying member within the hollow portion of said member, means for yieldingly supporting the rear end of the load carrying member upon the rear axle, a motor carried by the forward end of the load carrying member and means for transmitting power from the motor to the rear axle within the load carrying member and torque member.

10. In a motor vehicle, the combination with a front axle and a rear axle, of a load carrying member supported by said axles in a longitudinal vertical plane of the medial line of the vehicle and substantially in the horizontal plane of the axles, transverse members secured to the lower side of the load carrying member intermediate the ends thereof and below the horizontal plane of said axles, and a body secured to said transverse members with the load carrying member projecting above the horizontal plane of the bottom of said body.

11. In a motor vehicle, the combination with a front axle and a rear axle, of a single load carrying member extending longitudinally in the vertical plane of the medial line of the vehicle, and formed with a seat for a motor at its forward end, and an upwardly and rearwardly extending rear end, a motor secured upon said seat, means for yieldingly supporting the forward end of the load carrying member upon the front axle, means for yieldingly supporting the rear end of the load carrying member upon the rear axle with the curved rear end of said member spaced from the upper side of said axle, means within said member including a universal joint for transmitting motion from said motor, and means extending outside of said member for transmitting motion from said universal joint to said rear axle.

12. In a motor vehicle, the combination with a front axle and a rear axle, of a single hollow load carrying member extending longitudinally in substantially the vertical plane of the medial line of the vehicle and in the horizontal plane of the rear axle, a motor upon the forward end of said member, a transverse spring on the rear axle secured to the rear end of said member intermediate its ends, said rear end of said load carrying member being extended upwardly and over the rear axle, transverse members secured to the lower side of the load carrying member, and a body secured to said transverse members.

In testimony whereof I affix my signature in presence of two witnesses.

EMIL A. NELSON.

Witnesses:
G. E. McGRANN,
L. E. FLANDERS.